(12) United States Patent
Iwanaka et al.

(10) Patent No.: US 7,927,244 B2
(45) Date of Patent: Apr. 19, 2011

(54) HYBRID DRIVE APPARATUS

(75) Inventors: Makoto Iwanaka, Anjo (JP); Shigeki Takami, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 952 days.

(21) Appl. No.: 11/822,090

(22) Filed: Jul. 2, 2007

(65) Prior Publication Data

US 2008/0009380 A1    Jan. 10, 2008

(30) Foreign Application Priority Data

Jul. 10, 2006   (JP) .................................. 2006-189583

(51) Int. Cl.
*F16H 3/72* (2006.01)
(52) U.S. Cl. .............................. 475/5; 475/275; 475/284
(58) Field of Classification Search .............. 475/5, 271, 475/275–291
See application file for complete search history.

(56) References Cited

U.S. PATENT DOCUMENTS

| | | | |
|---|---|---|---|
| 6,478,705 B1 | 11/2002 | Holmes et al. | |
| 6,953,409 B2 | 10/2005 | Schmidt et al. | |
| 7,101,298 B2 | 9/2006 | Sowul et al. | |
| 7,479,080 B2 * | 1/2009 | Usoro | ................ 475/5 |
| 2004/0077448 A1 | 4/2004 | Oshidari et al. | |
| 2005/0221939 A1 | 10/2005 | Takami et al. | |
| 2006/0148606 A1 | 7/2006 | Bucknor et al. | |

FOREIGN PATENT DOCUMENTS

| | | |
|---|---|---|
| DE | 10 2005 045 320 A1 | 3/2006 |
| JP | A-2005-081930 | 3/2005 |
| JP | A-2005-170227 | 6/2005 |
| JP | A-2005-263184 | 9/2005 |
| JP | A-2006-022833 | 1/2006 |

* cited by examiner

*Primary Examiner* — David D Le
*Assistant Examiner* — Derek D Knight
(74) *Attorney, Agent, or Firm* — Oliff & Berridge, PLC

(57) ABSTRACT

A hybrid drive apparatus that includes an input shaft that is connected to an engine; an output shaft that is connected to wheels; a first rotary electric machine; a second rotary electric machine; a first planetary gear apparatus that has at least three rotating elements; a second planetary gear apparatus that has at least three rotating elements; and a plurality of friction engagement elements that selectively connect one rotating element of the first planetary gear apparatus and the second planetary gear apparatus to other rotating elements or that selectively hold the rotating element stationary on a non-rotating member.

12 Claims, 7 Drawing Sheets

○ : FIRST MOTOR-GENERATOR
□ : SECOND MOTOR-GENERATOR
△ : INPUT SHAFT (ENGINE)
☆ : OUTPUT SHAFT
× : BRAKE

US 7,927,244 B2

HYBRID DRIVE APPARATUS

INCORPORATION BY REFERENCE

The disclosure of Japanese Patent Application No. 2006-189583 filed on Jul. 10, 2006, including the specification, drawings, and abstract, is incorporated herein by reference in its entirety.

BACKGROUND

The present invention relates to hybrid drive apparatuses.

There exists a "split hybrid drive apparatus" that is provided with two rotary electric machines and a planetary gear apparatus for power distribution. In relation to this, for example, U.S. Pat. No. 6,953,409 discloses a split hybrid drive apparatus H having the structure that is shown in FIG. 11. This hybrid drive apparatus H is provided with an input shaft I that is connected to an engine E, an output shaft O that is connected to wheels, a first rotary electric machine MG1, a second rotary electric machine MG2, three planetary gear mechanisms PG1 to PG3, and clutches C1 and C2 and brakes B1 and B2 that carry out the engagement between each of the rotating elements of the planetary gear mechanisms PG1 to PG3 or between the rotating elements and the case Ds. Here, for convenience, the three planetary gear mechanisms are, in order from the engine E side, the first planetary gear mechanism PG1, the second planetary gear mechanism PG2, and the third planetary gear mechanism PG3.

This hybrid drive apparatus H realizes a first split mode by engaging the first brake B1, and realizes a parallel mode from this state by engaging the first clutch C1 or the second clutch C2. In addition, this hybrid drive apparatus H realizes a second split mode by engaging the first clutch C1 and realizes the parallel mode from this state by engaging the second brake B2 or the second clutch C2. Thereby, this hybrid drive apparatus H is structured so as to enable the realization of two split modes and a parallel mode having a four-stage fixed gear change ratio. Here, in the split modes, the rotational drive power of the input shaft I (engine E), the first rotary electric machine MG1, and the second rotary electric machine MG2 is distributed and combined by the first planetary gear mechanism PG1 and the second planetary gear mechanism PG2, and is transferred to a shaft Ma, which rotates integrally with the second rotary electric machine MG2. In addition, the rotational drive power that has been transferred to this shaft Ma is transferred to the output shaft O via the third planetary gear apparatus PG3. In contrast, in the parallel mode, the rotational speed of the input shaft I (engine E) is varied at a prescribed gear change ratio and is transferred to the output shaft O. At this time, the first rotary electric machine MG1 and the second rotary electric machine MG2 rotate at speeds that depend on the vehicle speed and the gear change ratio, and act as a motor and a generator.

In addition, this hybrid drive apparatus H is not provided with a reverse shift speed in which the rotation of the input shaft I (engine E) is reversed and transferred to the Output shaft O. Therefore, in the reverse mode for carrying out reverse travel, this hybrid drive apparatus H is structured so as to transfer the reverse direction rotational drive power to the output shaft O via the third planetary gear mechanism PG3 by rotating the second rotary electric machine MG2 in the opposite direction.

SUMMARY

However, in this structure for the hybrid drive apparatus H described above, when power generation is carried out by transferring the rotational drive power of the engine E to the first rotary electric machine MG1, the rotational drive power in the forward direction acts on the second rotary electric machine MG2 and the shaft Ma. Thus, when power generation is carried out while travelling in reverse by using the second rotary electric machine MG2, there is a problem in that a large reverse drive power cannot be output. Thus, the time interval during which reverse travel can be carried out by using the second rotary electric machine MG2, and the drive power that the second rotary electric machine MG2 is able to generate at this time are constrained by the state of charge of a storage apparatus such as a battery. Reverse travel by using the second rotary electric machine MG2 over an extended period of time at a large rotational drive power is thus difficult.

In consideration of the problems described above, the present invention thus provides, among other things, a hybrid drive apparatus that enables power generation to be carried out by transferring the rotational drive power of the engine to a first rotary electric machine and by transferring the rotational drive power of a second rotary electric machine to an output shaft while the rotational drive power of the engine is not being transferred to the output shaft. Travel by the second rotary electric machine can thus be carried out over an extended period of time with a large rotational drive power irrespective of the state of charge of a storage apparatus such as a battery.

An exemplary structure of the hybrid drive apparatus according to the present invention includes an input shaft that is connected to an engine; an output shaft that is connected to wheels; a first rotary electric machine; a second rotary electric machine; a first planetary gear apparatus that has at least three rotating elements; a second planetary gear apparatus that has at least three rotating elements; and a plurality of friction engagement elements that selectively connect one rotating element of the first planetary gear apparatus and the second planetary gear apparatus to other rotating elements or that selectively hold the rotating element stationary on a non-rotating member. The first planetary gear apparatus and the second planetary gear apparatus both comprise connection rotating elements that are connected via a transmitting member so as to rotate integrally. Two rotating elements of the first planetary gear apparatus, other than the connection rotating element, are connected respectively to the input shaft and the first rotary electric machine. Two rotating elements of the second planetary gear apparatus, other than the connection rotating element, are respectively connected to the output shaft and the second rotary electric machine. The plurality of friction engagement elements comprise a first brake that selectively holds the transmitting member and the connection rotating elements that rotate integrally therewith stationary on the non-rotating member.

An exemplary structure of the hybrid drive apparatus according to the present invention includes a first planetary gear apparatus that has at least three rotating elements; a second planetary gear apparatus that has at least three rotating elements; and a plurality of friction engagement elements that selectively connect one rotating element of the first planetary gear apparatus and the second planetary gear apparatus to other rotating elements or that selectively hold the rotating element stationary on a non-rotating member. The first planetary gear apparatus and the second planetary gear apparatus both comprise connection rotating elements that are connected via a transmitting member so as to rotate integrally. Two rotating elements of the first planetary gear apparatus, other than the connection rotating element, are capable of being connected respectively to an input shaft and a first rotary electric machine. Two rotating elements of the second planetary gear apparatus, other than the connection rotating element, are capable of being connected respectively to an output shaft and a second rotary electric machine. The plurality of friction engagement elements comprise a first brake that selectively holds the transmitting member and the connection rotating elements that rotate integrally therewith stationary on the non-rotating member.

BRIEF DESCRIPTION OF THE DRAWINGS

Various exemplary aspects of the invention will be described with reference to the drawings, wherein.

DETAILED DESCRIPTION OF EMBODIMENTS

1. First Embodiment

Figure 1:
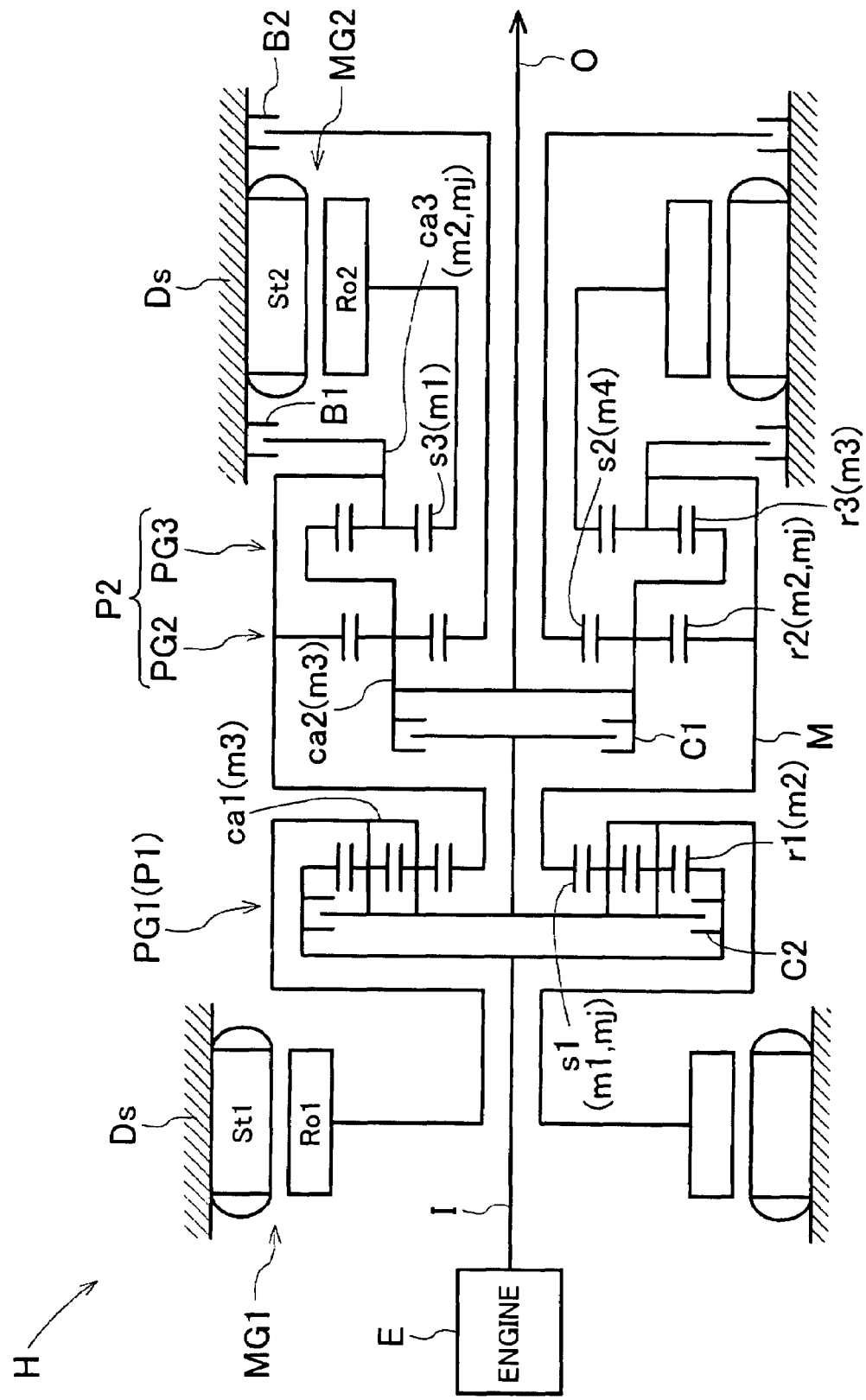
FIG. 1 is a skeleton diagram of the hybrid drive apparatus according to a first embodiment of the present invention.
Figure 2:
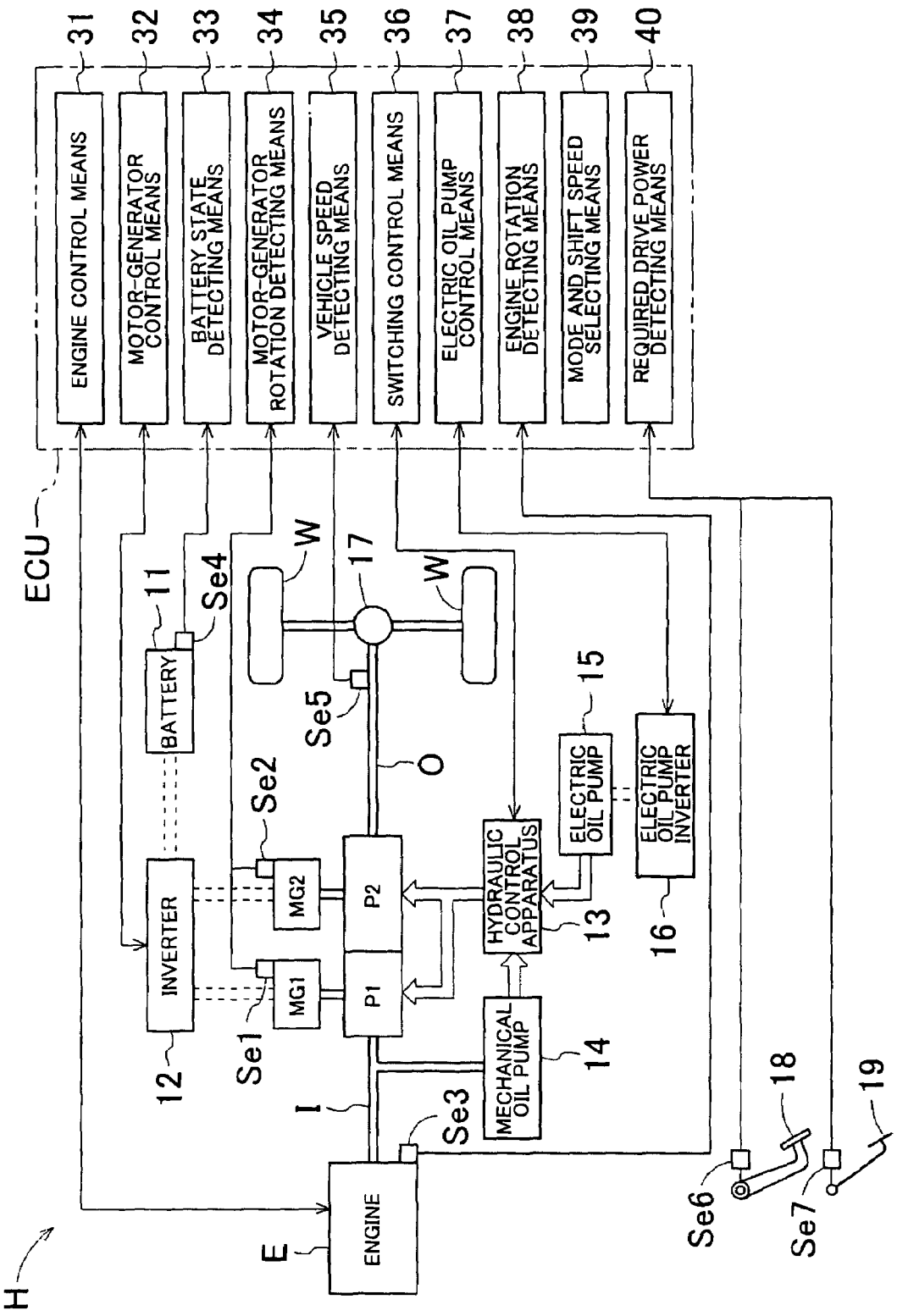
FIG. 2 is a pattern diagram that shows the system structure of the hybrid drive apparatus according to the first embodiment.

A first embodiment of the present invention will first be explained with reference to the drawings. FIG. 1 is a skeletal diagram that shows the structure of the hybrid drive apparatus H according to this embodiment. In addition, FIG. 2 is a pattern diagram that shows the system structure of the hybrid drive apparatus H according to this embodiment. Note that in FIG. 2, a double solid line indicates the transfer path for rotational drive power, a double broken line indicates the transmission path for electrical power, and an outline arrow indicates the flow of the hydraulic fluid. In addition, a solid arrow indicates the transmission path for various types of information. According to these figures, this hybrid drive apparatus H is provided with an input shaft I that is connected to an engine E, an output shaft O that is connected to wheels W, a first motor-generator MG1, a second motor-generator MG2, a first planetary gear mechanism PG1 that forms a first planetary gear apparatus P1, and a second planetary gear mechanism PG2 and a third planetary gear mechanism PG3 that form a second planetary gear apparatus P2. In addition, these structures are accommodated in a drive apparatus case Ds (below, simply referred to as the "case Ds"), which functions as an example of a non-rotating member that is fastened to the vehicle body. Note that the first motor-generator MG1 is an example of a "first rotary electric machine" of the present invention, and the second motor-generator MG2 is an example of a "second rotary electric machine" of the present invention.

1-1. The Structure of Each of the Components of the Hybrid Drive Apparatus H

As shown in FIG. 1 and FIG. 2, the input shaft I is connected to the engine E. Here, it is possible to use various types of well-known engines, such as a gasoline engine or a diesel engine, for the engine E. In the present embodiment, the input shaft I is integrally connected to an output rotating shaft such as the crankshaft of the engine E. Note that it is also advantageous to use a structure in which the input shaft I is connected to the output rotating shaft of the engine E via dampers, clutches, and the like, that are interposed therebetween. The output shaft O is connected to as to be able to transfer rotational drive power to the wheels W via a differential apparatus 17 and the like. In the present embodiment, the input shaft I and the output shaft O are disposed coaxially.

As shown in FIG. 1, the first motor-generator MG1 includes a stator St1 that is fastened to the case Ds and a rotor Ro1 that is supported so as to be able to freely rotate inside this stator St1 in the radial direction. The rotor Ro1 of this first motor-generator MG1 is connected to a carrier ca1 of the first planetary gear mechanism PG1 so as to rotate integrally therewith. In addition, the second motor-generator MG2 includes a stator St2 that is fastened to the case Ds and a rotor Ro2 that is supported so as to be able to freely rotate inside this stator St2 in the radial direction. The rotor Ro2 of this second motor-generator MG2 is connected to a sun gear s3 of the third planetary gear mechanism PG3 so as to rotate integrally therewith. As shown in FIG. 2, the first motor-generator MG1 and the second motor-generator MG2 are electrically connected to a battery 1, which functions as a storage apparatus, via inverters 12 respectively. In addition, the first motor-generator MG1 and the second motor-generator MG2 can function as motors that each receive a supply of electrical power to generate mechanical power, or function as generators that receive a supply of mechanical power to generate electrical power.

In the present example, the first motor-generator MG1 mainly carries out power generation by using the rotational drive power that has been input via the carrier cat to charge the battery 11, or supplies electrical power for driving the second motor-generator MG2. However, while the vehicle is traveling at a high speed, for example, the first motor-generator MG1 may also function as a motor. In contrast, the second motor-generator MG2 mainly functions as a drive motor that supplements the drive power for vehicle travel. However, during regenerative braking for decelerating the vehicle, for example, the second motor-generator MG2 functions as a generator. The operation of the first motor-generator MG1 and the second motor-generator MG2 is carried out via the inverter 12 according to control instructions from a control apparatus ECU.

As shown in FIG. 1, the first planetary gear mechanism PG1 is a double pinion planetary gear mechanism that is disposed coaxially to the input shaft I. Specifically, the first planetary gear mechanism PG1 includes, as rotating elements, the carrier cat that supports a plurality of pairs of pinion gears, and a sun gear s1 and a ring gear r1 that each mesh with the pinion gears. The sun gear s1 is connected to a ring gear r2 of the second planetary gear mechanism PG2 and a carrier ca3 of the third planetary gear mechanism PG3 via a transmitting member M so as to rotate integrally therewith. In the example, the transmitting member M is a substantially tubular shaped member that accommodates the second planetary gear mechanism PG2 and the third planetary gear mechanism PG3 therein. The ring gear r1 is connected to the input shaft I so as to rotate integrally therewith. The carrier ca1 is connected to the rotor Ro1 of the first motor-generator MG1 so as to rotate integrally therewith. Thereby, the first planetary gear mechanism PG1 functions mainly as a power distribution planetary gear mechanism that distributes the rotational drive power of the input shaft I to the first motor-generator MG1 and the transmitting member M. In the present embodiment, this first planetary gear mechanism PG1 is an example of a "first planetary gear apparatus P1" in the present invention. In addition, the sun gear s1, the ring gear r1, and the carrier ca1 of this first planetary gear mechanism PG1 respectively are examples of a "first rotating element (m1)," a "second rotating element (m2)," and a "third rotating element (m3)." In addition, the sun gear s1 (the first rotating element (m1)), which is connected to the transmitting member M so as to rotate integrally therewith, is an example of a "connection rotating element (mj)."

In addition, the carrier cat of the first planetary gear mechanism PG1 is selectively connected to the output shaft O via a first clutch C1. As will be explained below, the output shaft O is connected to a carrier ca2 of the second planetary gear mechanism PG2 and a ring fear r3 of the third planetary gear mechanism PG3 so as to rotate integrally therewith. Therefore, the first motor-generator MG1 and the carrier ca1 of the first planetary gear mechanism PG1 are selectively connected to the output shaft O, the carrier ca2 of the second planetary gear mechanism PG2, and the ring gear r3 of the third planetary gear mechanism PG3 via the first clutch C1. In addition, the ring gear r1 and the carrier ca1 of the first planetary gear mechanism PG1 are selectively connected via a second clutch C2. Therefore, when the second clutch C2 is engaged, the first planetary gear mechanism PG1 is directly linked so as to rotate integrally as a whole. Note that this second clutch C2 may selectively connect any two arbitrary rotating elements of the first planetary gear mechanism PG1, but the structure of the present example is not limited thereby.

The second planetary gear apparatus PG2 is a single pinion planetary gear mechanism that is disposed coaxially to the output shaft O. Specifically, the second planetary gear mechanism PG2 includes, as rotating elements, the carrier ca2 that supports a plurality of pinion gears, and a sun gear s2 and the ring gear r2 that each mesh with the pinion gears. The ring gear r2 is connected to the sun gear s1 of the first planetary gear mechanism PG1 and the carrier ca3 of the third planetary gear mechanism PG3 via the transmitting member M so as to rotate integrally therewith. The carrier ca2 is connected to the output shaft O and the ring gear r3 of the third planetary gear mechanism PG3 so as to rotate integrally therewith. The sun gear s2 is selectively held stationary on the case Ds via a second brake B2.

The third planetary gear mechanism PG3 is a single pinion planetary gear mechanism that is disposed coaxially to the output shaft O. Specifically, the third planetary gear mechanism PG3 includes, as rotating elements, the carrier ca3 that supports a plurality of pinion gears, and a sun gear s3 and the ring gear r3 that each mesh with pinion gears. The sun gear s3 is connected to the rotor Ro2 of the second motor-generator MG2 so as to rotate integrally therewith. The carrier ca3 is connected to the sun gear s1 of the first planetary gear mechanism PG1 and the ring gear r2 of the second planetary gear mechanism PG2 via the transmitting member M so as to rotate integrally therewith. The ring gear r3 is connected to the output shaft O and the carrier ca2 of the second planetary gear mechanism PG2 so as to rotate integrally therewith.

As has been described above, the second planetary gear mechanism PG2 and the third planetary gear mechanism PG3 structure the second planetary gear apparatus P2, in which two among the three rotating elements that are included in the second planetary gear mechanism PG2 and the third planetary gear mechanism PG3 are each connected together so as to rotate integrally, and the second planetary gear apparatus P2 thereby has four rotating elements. This second planetary gear apparatus P2 mainly functions as a speed shift planetary gear mechanism in which the rotational speed of the transmitting member M and the second motor-generator MG2 is changed and the resulting rotational speed is transferred to the output shaft O. In the present embodiment, the sun gear s3 of the third planetary gear mechanism PG3 is an example of a "first rotating element (m1)" of the second planetary gear apparatus P2. The ring gear r2 of the second planetary gear mechanism PG2 and the carrier ca3 of the third planetary gear mechanism PG3, which rotate together integrally, are examples of a "second rotating element (m2)" of the second planetary gear apparatus P2. The carrier ca2 of the second planetary gear mechanism PG2 and the ring gear r3 of the third planetary gear mechanism PG3 are examples of a "third rotating element (m3)" of the second planetary gear apparatus P2. The sun gear s2 of the second planetary gear mechanism PG2 is an example of a "fourth rotating element (m4)" of the second planetary gear apparatus P2. In addition, the ring gear r2 of the second planetary gear mechanism PG2 and the carrier ca3 (the second rotating element (m2)) of the third planetary gear mechanism PG3, which are connected to the transmitting member M so as to rotate integrally therewith, are examples of a "connection rotating element (mj)."

In addition, in the hybrid drive apparatus H, the transmitting member M is selectively held stationary on the case Ds via a first brake B1. Therefore, the sun gear s1 of the first planetary gear mechanism PG1 (the first rotating element (m1) of the first planetary gear apparatus P1) of the first planetary gear mechanism PG1, the ring gear r2 of the second planetary gear mechanism PG2, and the carrier ca3 of the third planetary gear mechanism PG3 (the second rotating element (m2) of the second planetary gear apparatus P2), all of which also function as connection rotating elements that rotate integrally with this transmitting member M, are similarly selectively held stationary on the case Ds via the first brake B1.

As has been described above, this hybrid drive apparatus H is provided, as friction engagement elements, with the first clutch C1, the second clutch C2, the first brake B1, and the second brake B2. These friction engagement elements each selectively connect one of the rotating elements of the first planetary gear apparatus P1 and the second planetary gear apparatus P2 to the rotating elements of the other, or selectively hold these rotating elements stationary on the case Ds which is an example of a non-rotating member. Therefore, these friction engagement elements are an example of the "plurality of friction engagement elements" of the present invention. It is possible to use multi-plate clutches or multi-plate brakes that are actuated by hydraulic pressure for any of these friction engagement elements. As shown in FIG. 2, the hydraulic pressure that is supplied to these friction engagement elements is controlled by a hydraulic control apparatus 13, which is operated by command instructions from the control apparatus ECU. The supply of the hydraulic fluid to this hydraulic control apparatus 13 can be carried out by a mechanical oil pump 14 while the engine is in operation, or can be carried out by an electric oil pump 15 while the engine is stopped. Here, the mechanical oil pump 14 is driven by the rotational drive power of the input shaft I. In addition, the electric oil pump 15 is driven by the electric power (the supply path is omitted in the figures) from the battery 11 that is supplied via an electric oil pump inverter 16. Note that in FIG. 2, the separate friction engagement elements are omitted because it is assumed that they are included in the first planetary gear apparatus P1 and the second planetary gear apparatus P2.

1-2. The Structure of the Control System for the Hybrid Drive Apparatus H

In addition, as shown in FIG. 2, the control apparatus ECU uses information that has been obtained from the sensors Se1 to Se7, which are provided on each of the components of the vehicle, and carries out the operational control of the engine E, the first motor-generator MG1, the second motor-generator MG2, each of the friction engagement elements C1, C2, B1 and B2 via the hydraulic control apparatus 13, the electric oil pump 15, and the like. Examples of such sensors that are provided include a first motor-generator rotational speed sensor Se1, a second motor-generator rotational speed sensor Se2, an engine rotational speed sensor Se3, a battery state detecting sensor Se4, a vehicle speed sensor Se5, an accelerator operation detecting sensor Se6, and a brake operation detecting sensor Se7.

Here, the first motor-generator rotational speed sensor Se1 is a sensor for detecting the rotational speed of the rotor Ro1 of the first motor-generator MG1. The second motor-generator rotational speed sensor Se2 is a sensor for detecting the rotational speed of the rotor Ro2 of the second motor-generator MG2. The engine rotational speed sensor Se3 is a sensor for detecting the rotational speed of the output rotation shaft of the engine E. Here, because the input shaft I rotates integrally with the output rotation shaft of the engine E, the rotational speed of the engine E that is detected by this engine rotational speed sensor Se3 matches the rotational speed of the input shaft I. The battery state detecting sensor Se4 is a sensor for detecting, for example, the state of charge of the battery 11. The vehicle speed sensor Se5 is a sensor for detecting the rotational speed of the output shaft O in order to detect the vehicle speed. The accelerator operation detecting sensor Se6 is a sensor for detecting the amount of operation of an accelerator pedal 18. The brake operation detecting sensor Se7 is a sensor for detecting the amount of operation of a brake pedal 19, which is coupled with the wheel brakes (not illustrated).

In addition, the control apparatus ECU is provided with an engine control means 31, a motor-generator control means 32, a battery state detecting means 33, a motor-generator rotation detecting means 34, a vehicle speed detecting means 35, a switching control means 36, an electric oil pump control means 37, an engine rotation detecting means 38, a mode and shift speed selecting means 39, and a required drive power detecting means 40. Each of the these means in the control apparatus ECU is structured by the functional units for carrying out the various types of processing on the input data being implemented by using hardware, software (programs), or both, where an arithmetic processing apparatus, such as a CPU, serves as a central member. It should be noted that although the term "means" is being used, the term "means," "device," and "unit," etc. should being considered synonyms.

The engine control means 31 carries out, for example, the operational control of the start-up, stopping, and rotational speed control operations, and the output torque control of the engine E. The motor-generator control means 32 carries out, for example, the operational control of the rotational speed control and the rotational torque control of the first motor-generator MG1 and the second motor-generator MG2 via the inverter 12. The battery state detecting means 33 detects, for example, the state of charge of the battery 11 based on the output of the battery state detecting sensor Se4. The motor-generator rotation detecting means 34 detects the rotational speed of the first motor-generator MG1 and the second motor-generator MG2 based on the output of the first motor-generator rotational speed sensor Se1 and the second motor-generator rotational speed sensor Se2. The vehicle speed detecting means 35 detects the vehicle speed based on the output from the vehicle speed sensor Se5. The switching control means 36 carries out the engagement and disengagement of each of the friction engagement elements C1, C2, B1, and B2 (refer to FIG. 1) of the hybrid drive apparatus H, and switches the operating mode and the shift speed of the hybrid drive apparatus H by controlling the operation of the hydraulic control apparatus 13. The electric oil pump control means 37 carries out operational control of the electric oil pump 15 via the electric oil pump inverter 16. The engine rotation detecting means 38 detects the rotational speed of the output rotation shaft of the engine E and the input shaft I based on the output from the engine rotational speed sensor Se3.

Figures 3, 4:
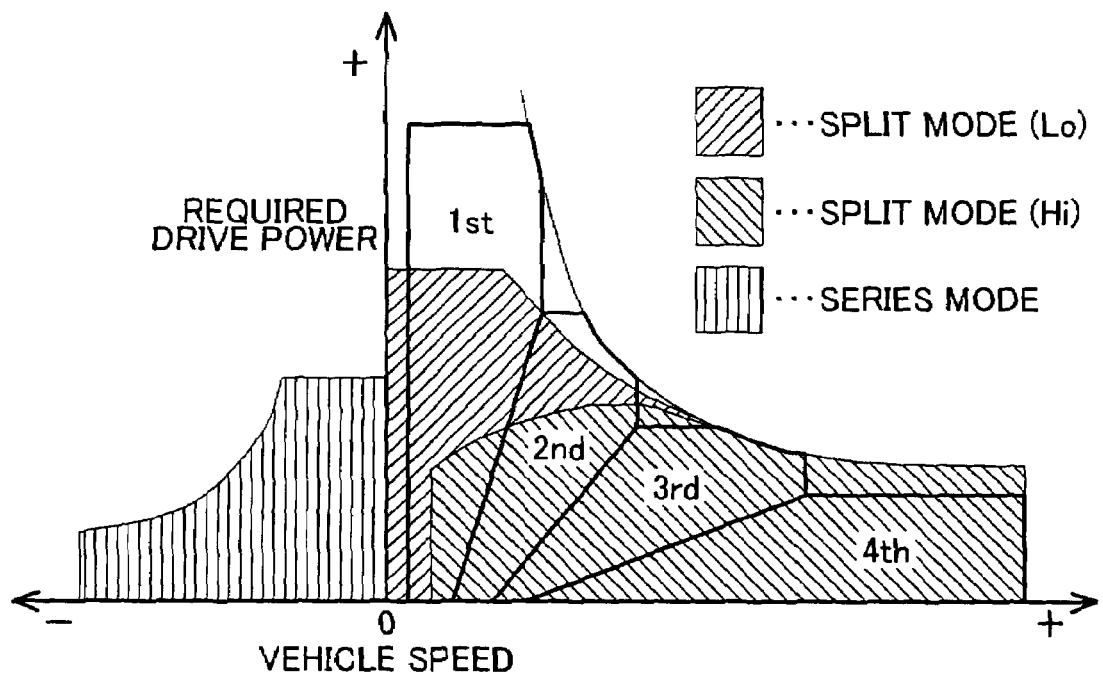
FIG. 3 is a drawing that shows an example of a control map according to the first embodiment.
FIG. 4 is a drawing that shows the operation table according to the first embodiment.

The mode and shift speed selecting means 39 carries out the selection of the operating mode and the shift speed according to a control map such as that shown in FIG. 3. FIG. 3 is a drawing that shows a map that determines the relationships between the vehicle speed, the required drive power, and the assigned range for each of the shift speeds that is provided for each of the operating modes, and is an example of a control map that is used in this mode and shift speed selecting means 39. The abscissa axis in the figure denotes the vehicle speed and the ordinate axis denotes the required drive power based, for example, on the accelerator operation of the driver. The mode and shift speed selecting means 39 carries out the selection of an appropriate operating mode and shift speed according to this control map depending on the vehicle speed and the required drive power. Specifically, the mode and shift speed selecting means 39 obtains information about the vehicle speed from the vehicle speed detecting means 35. Then, the mode and shift speed selecting means 39 obtains information about the required drive power from the required drive power detecting means 40. In addition, the mode and shift speed selecting means 39 selects the operating mode and the shift speed, which are regulated depending on the obtained vehicle speed and the required drive power according to the control map that is shown in FIG. 3. Note that in the area where the split mode and the parallel mode overlap, the mode and shift speed selecting means 39 selects the operating mode that is most suitable for a combination of various conditions such as the battery state of charge, the cooling fluid temperature, and the oil temperature. In addition, in the present embodiment, the series mode is a reverse mode that is used when the vehicle is travelling in reverse. Therefore, the mode and shift speed selecting means 39 selects the series mode during reverse, for example, the case in which the reverse range has been selected by the shift lever (not illustrated), that is, in the case in which the vehicle speed is negative. The required drive power detecting means 40 calculates and obtains the required drive power by the driver based on the output from the accelerator operation detecting sensor Se6 and the brake operation detecting sensor Se7.

1-3. The Operating Modes of the Hybrid Drive Apparatus H

Figure 5:
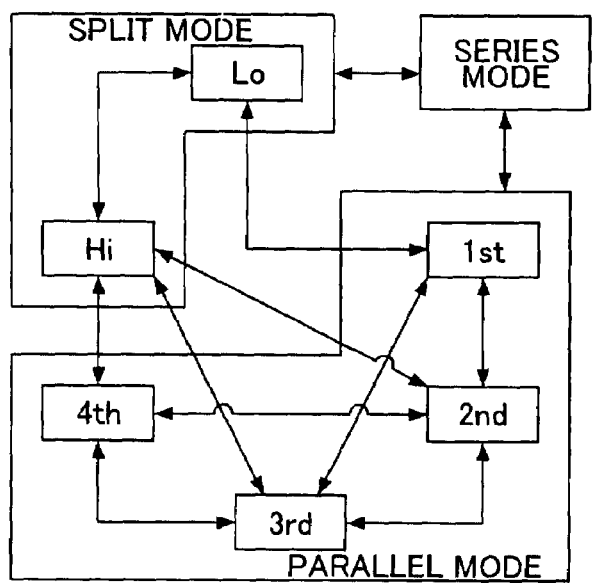
FIG. 5 is a drawing that shows the relationship between the operating modes and the shift speeds that are available for switching according to the first embodiment.

Next, the operating modes that can be realized by the hybrid drive apparatus H according to the present embodiment will be explained. FIG. 4 is an operating diagram that shows a plurality of operating modes and the operating state of each of the friction engagement elements C1, C2, B1, and B2 at each of the shift speeds that are provided for each of the operating modes. In this figure, an O represents the state in which each of the friction engagement elements is engaged. In contrast, a blank represents a state in which each of the friction engagement elements is disengaged. In addition, FIG. 5 is a drawing that shows the relationships between the operating modes and shift speeds that are available for switching. Note that in the present embodiment, the series mode is a reverse mode, and thus basically switching is carried out from another mode to the series mode while the vehicle is stopped.

Figure 6:
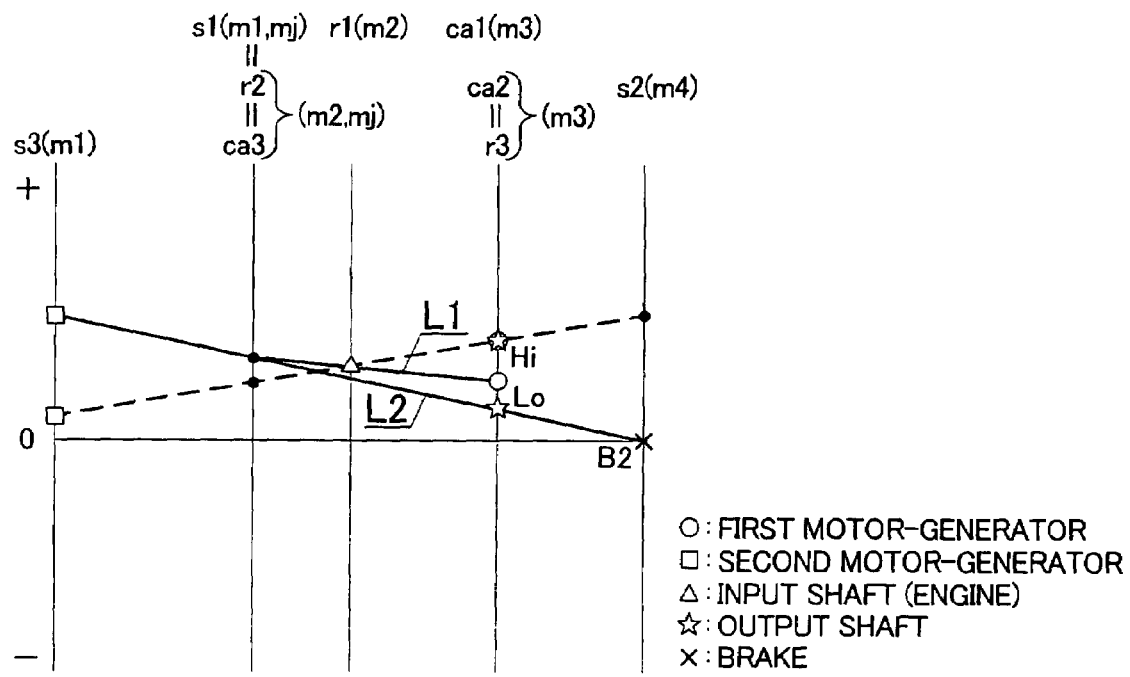
FIG. 6 is a velocity diagram for the split mode according to the first embodiment.
Figure 7:
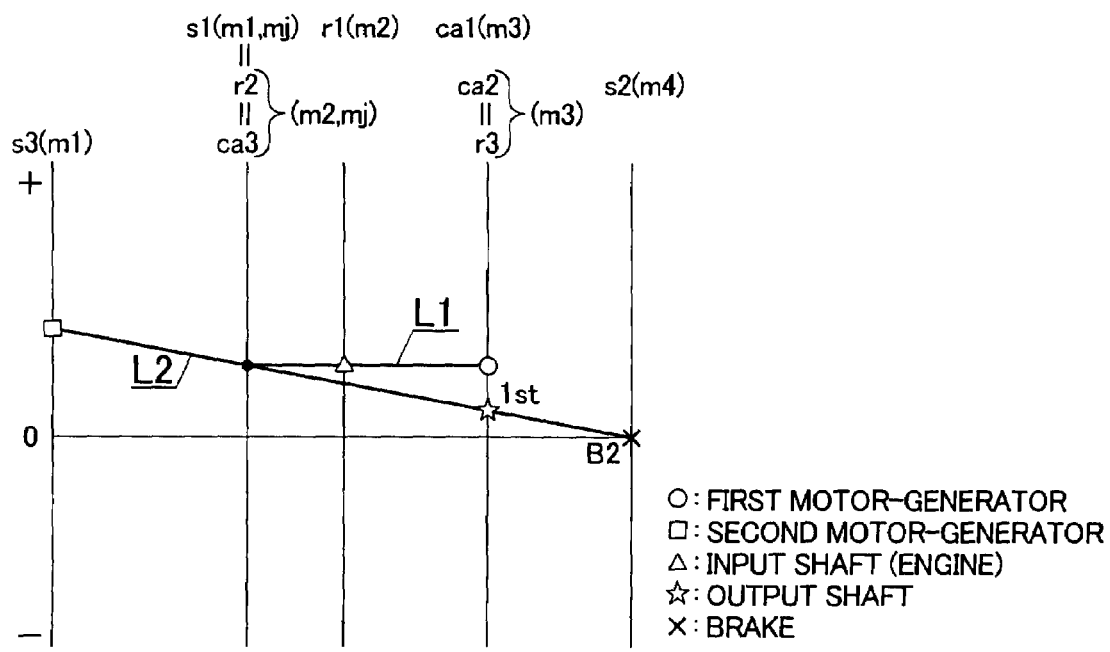
FIG. 7 is a velocity diagram (1) for the parallel mode according to the first embodiment.
Figure 8:
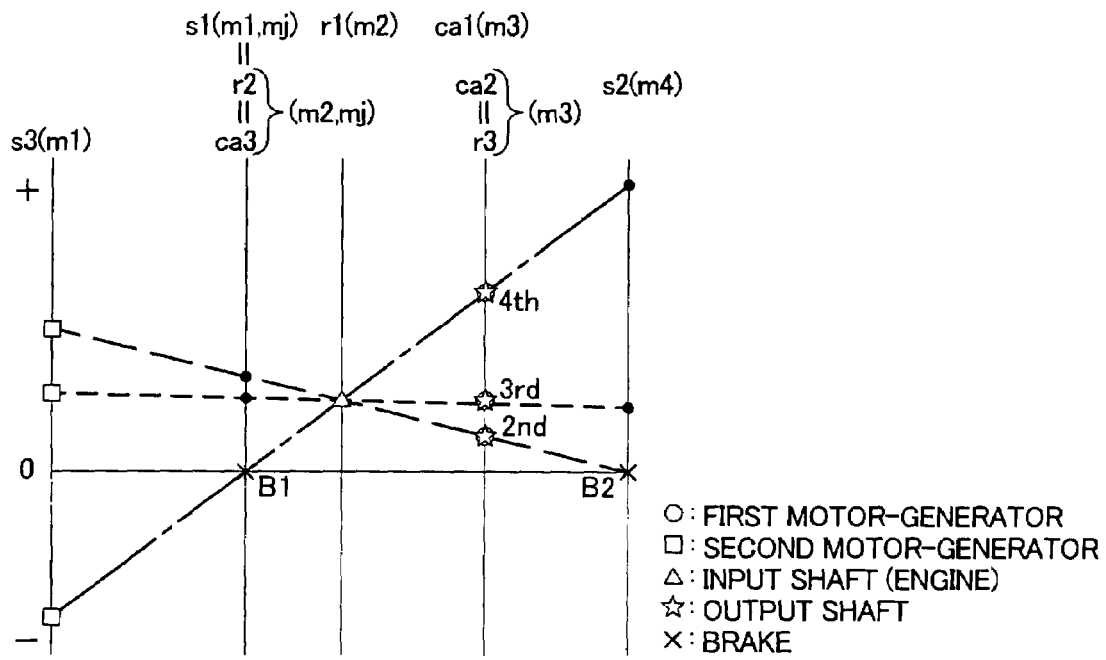
FIG. 8 is a velocity diagram (2) for the parallel mode according to the first embodiment.
Figure 9:
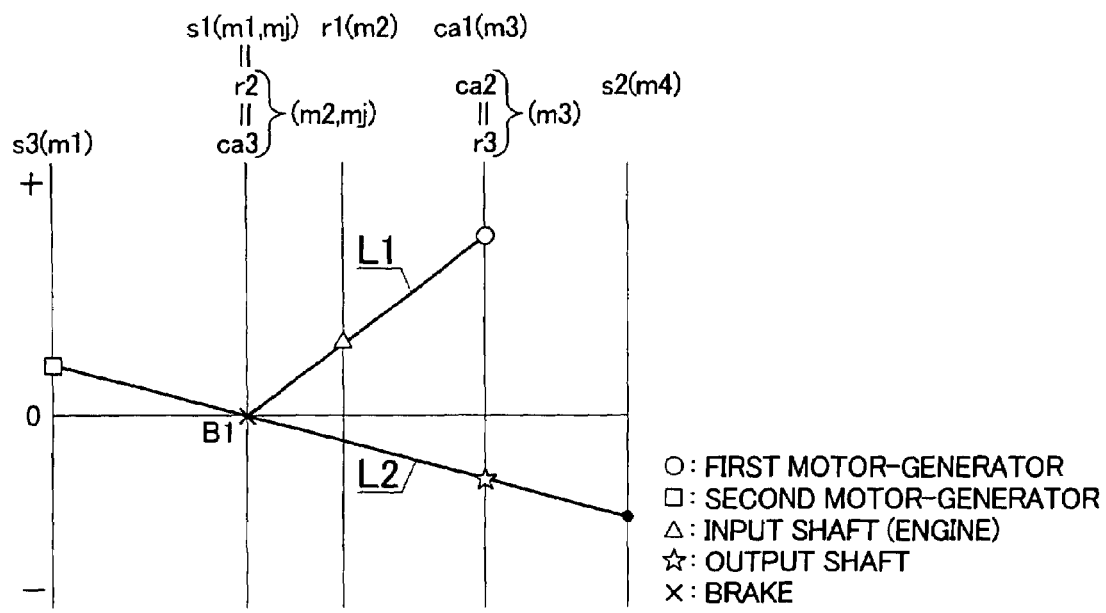
FIG. 9 is a velocity diagram for the series mode according to the first embodiment.

FIG. 6 to FIG. 9 show velocity diagrams of the first planetary gear apparatus P1 and the second planetary gear apparatus P2, where FIG. 6 shows a velocity diagram for the split mode, FIG. 7 and FIG. 8 show the velocity diagrams for the parallel mode, and FIG. 9 shows a velocity diagram for the series mode. In these velocity diagrams, the ordinates correspond to the rotational speeds of each of the rotating elements. Specifically, the "0" on an ordinate indicates that the rotational speed is nil, the portion of the ordinate above the "0" indicates that the rotational speed is positive, and the portion of the ordinate below "0" indicates that the rotational speed is negative. In addition, each of the plurality of ordinates that are disposed in parallel corresponds to each of the rotating elements of the first planetary gear apparatus P1 and the second planetary gear apparatus P2. That is, "s1," "r1," and "ca1" shown above the ordinates respectively correspond to the sun gear s1, the ring gear r1, and the carrier ca1 of the first planetary gear mechanism PG1 that structures the first planetary gear apparatus P1; "r2," "ca2," and "s2" respectively correspond to the ring gear r2, the carrier ca2, and the sun gear s2 of the second planetary gear mechanism PG2 that structures the second planetary gear apparatus P2; and "s3," "ca3," and "r3" respectively correspond to the sun gear s3, the carrier ca3, and the ring gear r3 of the third planetary gear mechanism PG3 that structures the second planetary gear apparatus P2. In addition, the gaps between the ordinates that correspond to each of the rotating elements correspond to the gear ratios of the first planetary gear mechanism PG1, the second planetary gear mechanism PG2, and the third planetary gear mechanism PG3. In addition, in FIG. 6, FIG. 7, and FIG. 9, a straight line L1 shows the operating state of the first planetary gear apparatus P1, and a straight line L2 shows the operating state of the second planetary gear apparatus P2. Note that in a high speed (Hi) of the split mode that is shown in FIG. 6 and the second through the fourth speeds of the parallel mode that are shown in FIG. 8, the first planetary gear apparatus P1 and the second planetary gear apparatus P2 lie on the same straight line in the velocity diagram, and thus each of the straight lines show the operating state of both the first planetary gear apparatus P1 and the second planetary gear apparatus P2 in each of the shift speeds. Note that in these velocity diagrams, "○" indicates the rotational speed of the first motor-generator MG1, " " indicates the rotational speed of the second motor-generator MG2, "Δ" indicates the rotational speed of the input shaft I (engine E), "☆" indicates the rotational speed of the output shaft O, and "x" indicates the brake.

In FIG. 3 to FIG. 8, "Lo" and "Hi" respectively denote a low speed and a high speed of the split mode. In addition, "1st," "2nd," "3rd," and "4th" respectively denote the first speed, the second speed, the third speed, and the fourth speed of the parallel mode. Below, when referring simply to "low speed" and "high speed," the low speed and the high speed of the split mode are respectively denoted, and when referring simply to "first speed," "second speed," "third speed," and "fourth speed," the first speed, the second speed, the third speed, and the fourth speed of the parallel mode are respectively denoted. In addition, in the explanation of the present embodiment, when simply referring to "shift speed," all or a portion among the plurality of shift speeds of the split mode and the plurality of shift speeds of the parallel modes are denoted inclusively.

As shown in FIG. 3 to FIG. 9, this hybrid drive apparatus H is structured so as to be able to switch between three operating modes, that is, the "split mode," the "parallel mode," and the "series mode." In addition, this hybrid drive apparatus H includes two shift speeds in the split mode and four shift speeds in the parallel mode. Additionally, as described above, in the present embodiment, the series mode is the reverse mode that is used when the vehicle is travelling in reverse. These operating modes and the shift speeds in each of these operating modes are selected according to the control map that is shown in FIG. 3 by the mode and shift speed selecting means 39. In addition, the switching to the selected operating mode and the shift speed is carried out by each of the friction engagement elements C1, C2, B1, and B2 being engaged and disengaged according to control commands from the control apparatus ECU. Note that at this time, the control apparatus ECU carries out, for example, control of the rotational speed and rotational torque of the first motor-generator MG1 and the second motor-generator MG2 by the motor-generator control means 32 and control of the rotational speed and rotational torque of the engine E by the engine control means 31. Below, the operating states of the hybrid drive apparatus H for each of the operating modes will be explained in detail.

1-4. Split Mode

The split mode is a mode in which travel occurs while the rotational drive power of the input shaft I (engine E) is distributed to both the first motor-generator MG1 and the transmitting member M via the first planetary gear apparatus P1 (the first planetary gear mechanism PG1), and the rotational drive power that has been distributed at least to the transmitting member M via the second planetary gear apparatus P2 (the second planetary gear mechanism PG2 and the third planetary gear mechanism PG3) is transferred to the output shaft O. In the present embodiment, the hybrid drive apparatus H includes two shift speeds, that is, the "low speed (Lo)" and the "high speed (Hi)," in the split mode. In addition, as shown in FIG. 5, the low speed (Lo) can switch between the high speed (Hi) and the first speed (1st) of the parallel mode. In addition, the high speed (Hi) can switch between the low speed (Lo) and the second speed (2nd), the third speed (3rd), and the fourth speed (4th) of the parallel mode.

As shown in FIG. 4, in the low speed (Lo) of the split mode, the sun gear s2 of the second planetary gear mechanism PG2 is held stationary on the case Ds because the second brake B2 is engaged. In addition, as shown by the straight line L1 in FIG. 6, in the first planetary gear apparatus P1 (the first planetary gear mechanism PG1), the ring gear r1, which is intermediate in order of rotational speed, rotates integrally with the input shaft I (engine E), and this rotational drive power is distributed to the sun gear s1 and the carrier ca1. In addition, the rotational drive power that has been distributed to the sun gear s1 is transferred to the ring gear r2 of the second planetary gear mechanism PG2 and the carrier ca3 of the third planetary gear mechanism PG3 via the transmitting member M, and the rotational drive power that has been distributed to the carrier ca1 is transferred to the rotor Ro1 of the first motor-generator MG1 (refer to FIG. 1). At this time, while the engine E is controlled so as to maintain a high efficiency and low exhaust gas state (generally conforming to optimal fuel consumption characteristics), a positive direction rotational torque is transferred to the ring gear r1 via the input shaft I. In addition, the first motor-generator MG1 transfers the reaction force of the rotational torque of the input shaft I to the carrier ca1 by outputting a negative direction rotational torque. Additionally, the rotational speed of the sun gear s1 (the transmitting member M) is determined by the rotational speed of the first motor-generator MG1. In a state of normal travel, the first motor-generator MG1 carries out electrical power generation by generating a negative direction rotational torque while rotating positively (i.e., the rotational speed is positive).

In addition, in this low speed (Lo), as shown by the straight line L2 in FIG. 6, in the second planetary gear apparatus P2 (the second planetary gear mechanism PG2 and the third planetary gear mechanism PG3), in order of rotational speed, the sun gear s3 of the third planetary gear mechanism PG3, which serves as the first rotating element (m1), rotates integrally with the rotor Ro2 of the second motor-generator MG2; the ring gear r2 of the second planetary gear mechanism PG2 and the carrier ca3 of the third planetary gear mechanism PG3, which act as the second rotating element (m2), rotate integrally with the transmitting member M; the carrier ca2 of the second planetary gear mechanism PG2 and the ring gear r3 of the third planetary gear mechanism PG3, which function as the third rotating element (m3), rotate integrally with the output shaft O; and the sun gear s2 of the second planetary gear mechanism PG2, which functions as the fourth rotating element (m4), is held stationary on the case Ds by the second brake B2. Thereby, the rotational drive power of the input shaft I (engine E), which has been distributed from the first planetary gear apparatus P1 to the transmitting member M, and the rotational drive power of the second motor-generator MG2 are transferred to the output shaft O. At this time, the rotation of the transmitting member M and the rotation of the second motor-generator MG2 are transferred to the output shaft O after the absolute value of the rotational speeds thereof has been reduced.

As shown in FIG. 4, in the high speed (Hi) of the split mode, the carrier ca1 of the first planetary gear mechanism PG1 is directly linked to the output shaft O because the first clutch C1 is engaged, and these rotate integrally. Thereby, in this high speed, as shown in FIG. 6, the first planetary gear apparatus P1 and the second planetary gear apparatus P2 lie on the same straight line in the velocity diagram. In addition, among these rotating elements, the ring gear r1 of the first planetary gear mechanism PG1, which is intermediate in order of rotational speed, rotates integrally with the input shaft I; the carrier ca2 of the second planetary gear mechanism PG2 and the ring gear r3 of the third planetary gear mechanism PG3, which are at one side in order of rotational speed, rotate integrally with output shaft O and the first motor-generator MG1; and the sun gear s3 of the third planetary gear mechanism PG3, which is at the other side in order of rotational speed, rotates integrally with the second motor-generator MG2. At this time, while the engine E is controlled so as to maintain a high efficiency and low exhaust gas state (generally conforming to optimal fuel consumption characteristics), a positive direction rotational torque is transferred to the ring gear r1 of the first planetary gear mechanism PG1 via the input shaft I. In addition, the second motor-generator MG2 transfers the reaction force of the rotational torque of the input shaft I to the sun gear s3 gear of the third planetary gear mechanism PG3 by outputting a negative direction rotational torque. Additionally, the rotational speed of the output shaft O is determined by the rotational speeds of the input shaft I (engine E) and the second motor-generator MG2. Thereby, the rotational drive power of the input shaft I (engine E) is transferred to the output shaft O via the first planetary gear apparatus P1, and the rotational power drive of the second motor-generator MG2 is transferred to the output shaft O via the second planetary gear apparatus P2. Note that, at this time, if a positive direction rotational torque is output to the first motor-generator MG1, then it is possible to travel while deficient rotational drive power is assisted by the first motor-generator MG1.

1-5. Parallel Mode

The parallel mode is a mode that has a plurality of shift speeds, and travel Occurs while the rotational speed of the input shaft I is reduced and transferred to the output shaft O at a predetermined gear change ratio according to each of the shift speeds. In the present embodiment, in the parallel mode, the hybrid drive apparatus H includes a "first speed (1st)" and a "second speed (2nd)" that act as deceleration speeds that reduce the rotational speed of the input shaft I and the second motor-generator MG2, and transmit the resulting rotational speed to the output shaft O; a "third speed (3rd)" that functions as a direct link in which the rotational speed of the input shaft I and the second motor-generator MG2 is transferred to the output shaft at the same speed; and a "fourth speed (4th)" that functions as an acceleration speed that increases the rotational speed of the input shaft I and transfers the resulting rotational speed to the output shaft O.

In addition, as shown in FIG. 5, the first speed (1st) is able to switch between the second speed (2nd) and the third speed (3rd), in addition to the low speed (Lo) of the split mode. The second speed (2nd) is able to switch between the first speed (1st), the third speed (3rd), and the fourth speed (4th), in addition to the high speed (Hi) of the split mode. The third speed (3rd) is able to switch between the first speed (1st), the second speed (2nd), and the fourth speed (4th), in addition to the high speed (Hi) of the split mode. The fourth speed (4th) is able to switch between the second speed (2nd) and the third speed (3rd), in addition to the high speed (Hi) of the split mode. Below, the operating states of the hybrid drive apparatus H in each of the shift speeds will be explained.

As shown in FIG. 4, in the first speed (1st) of the parallel mode, the second clutch C2 and the second brake B2 are engaged. In addition, because the second clutch C2 is engaged, as shown by the straight line L1 in FIG. 7, the first planetary gear mechanism PG1 is directly linked so as to rotate integrally as a whole, and the rotational speed of the input shaft I is transferred to the transmitting member M at the same speed. Additionally, as shown by straight line L2 in FIG. 7, because the second brake B2 is engaged, the rotation of this transmitting member M and the rotation of the second motor-generator MG2 are reduced, and the resulting rotation is transferred to the carrier ca2 of the second planetary gear mechanism PG2 and the ring gear r3 of the third planetary gear mechanism PG3 to be output from the output shaft O. Among the plurality of shift speeds of the parallel mode, the gear change ratio of the first speed is set so as to be the largest.

As shown in FIG. 4, in the second speed (2nd), the third speed (3rd), and the fourth speed (4th) of the parallel mode, because the first clutch C1 is engaged, the carrier ca1 of the first planetary gear mechanism PG1 and the first motor-generator MG1 are directly linked to the output shaft O, and these rotate integrally. Therefore, as shown in FIG. 8, the first planetary gear apparatus P1 and the second planetary gear apparatus P2 lie on the same straight line in the velocity diagram. In addition, in the second speed (2nd) of this parallel mode, because the second brake B2 is engaged, the sun gear s2 of the second planetary gear mechanism PG2, which strictures the second planetary gear apparatus P2, is held stationary on the case Ds. In the third gear (3rd), because the second clutch C2 is engaged, the first planetary gear apparatus P1 and the second planetary gear apparatus P2 are directly linked so as to rotate integrally as a whole. In the fourth speed (4th), because the first brake B1 is engaged, the transmitting member M and the sun gear s1 of the first planetary gear mechanism PG1, the ring gear r2 of the second third planetary gear mechanism PG2, and the carrier ca3 of the third planetary gear mechanism PG3, which rotate integrally therewith, are held stationary on the case Ds. Thereby, the rotational speed of the input shaft I (engine E) is changed (reduced, not changed, or increased) depending on the gear change ratios of each of the shift speeds (2nd, 3rd, and 4th), and the resulting rotational speed is transferred to the output shaft O to be output.

In this parallel mode, by running the second motor-generator MG2, it is possible to travel while the rotational drive power of the engine E is assisted by the rotational drive power of the second motor-generator MG2. In addition, it is possible to assist the rotational drive power of the engine E because the first motor-generator MG1 carries out power generation by generating negative direction rotational torque or runs by generating positive direction rotational torque. Note that it is possible to set the first motor-generator MG1 and the second motor-generator MG2 to a state in which they generate no rotational torque.

1-6. Series Mode

Series mode is a mode in which travel occurs while power generation is carried out by transferring the rotational drive power of the input shaft I (engine E) to the first motor-generator MG1 via the first planetary gear apparatus P1 (the first planetary gear mechanism PG1), and the rotational drive power of the second motor-generator MG2 is transferred to the Output shaft O via the second planetary gear apparatus P2 (the second planetary gear mechanism PG2 and the third planetary gear mechanism PG3). In the present embodiment, the series mode serves as the mode for reverse, which is used when the vehicle is travelling in reverse.

As shown in FIG. 4, in the series mode, because the first brake B1 is engaged, the transmitting member M is held stationary on the case Ds. Thereby, the sun gear s1 of the first planetary gear mechanism PG1, the ring gear r2 of the second planetary gear mechanism PG2, and the carrier ca3 of the third planetary gear mechanism PG3 are held stationary on the case Ds. In addition, as shown by the straight line L1 in FIG. 9, in the first planetary gear apparatus P1 (the first planetary gear mechanism PG1), the ring gear r1, which acts as the second rotating element (m2) that is intermediate in order of rotational speed, rotates integrally with the input shaft I (engine E). Additionally, this rotational drive power is transferred to the rotor Ro1 of the first motor-generator MG1 via the carrier ca1, which functions as the third rotating element (m3) that is at one side in order of rotational speed. In addition, the first motor-generator MG1 carries out power generation by generating negative direction rotational torque while rotating positively (the rotational speed is positive). At this time, the engine E is controlled so as to maintain a high efficiency and low exhaust gas state (generally conforming to optimal fuel consumption characteristics). Note that at this time, the sun gear s1, which functions as the first rotating element (m1) that is at the other side of the order of rotational speed, is held stationary on the case Ds, and thus the sun gear s1 does not rotate.

In contrast, as shown by the straight line L2 in FIG. 9, in order of rotational speed, in the second planetary gear apparatus P2 (the second planetary gear mechanism PG2 and the third planetary gear mechanism PG3), the sun gear s3 of the third planetary gear mechanism PG3, which functions is the first rotating element (m1), rotates integrally with the rotor Ro2 of the second motor-generator MG2; the ring gear r2 of the second planetary gear mechanism PG2 and the carrier ca3 of the third planetary gear mechanism PG3, which function as the second rotating element (m2), are held stationary on the case Ds via the first brake B1; and the carrier ca2 of the second planetary gear mechanism PG2 and the ring gear r3 of the third planetary gear mechanism PG3, which function as the third rotating element (m3), rotate integrally with the output shaft O. Therefore, if the second motor-generator MG2 is run so as to generate positive direction rotational torque while rotating positively (the rotational speed is positive), then a negative rotation (the rotational speed is negative) and a negative direction rotational torque are transferred to the output shaft O, and it is possible for the vehicle to travel in reverse. At this time, electric power that has been generated by the first motor-generator MG1 is supplied to the second motor-generator MG2. Note that in this series mode, if the second motor-generator MG2 is run such that a negative direction rotational torque is generated while rotating negatively, then the vehicle can travel in the forward direction.

In this series mode, the transmitting member M, the sun gear s1 of the first planetary gear mechanism PG1, the ring gear r2 of the second planetary gear mechanism PG2, and the carrier ca3 of the third planetary gear mechanism PG3, which functions as the connecting rotating elements (mj), are held stationary by the case Ds, which functions as a non-rotating member, by the first brake B1. In this state, the rotation of the input shaft I (engine E) is transferred to the first motor-generator MG1 via the first planetary gear apparatus P1 (the first planetary gear mechanism PG1), but it is not transferred to the output shaft O and the second motor-generator MG2. Thus, while electric power is generated by transferring the rotational drive power of the engine E to the first motor-generator MG1, without the influence thereof, it is possible to travel by transferring the rotational drive power that is generated by running the second motor-generator MG2 to the output shaft O via the second planetary gear apparatus P2 (the second planetary gear mechanism PG2 and the third planetary gear mechanism PG3). Therefore, it is possible to run the second motor-generator MG2 over an extended period of time with a large rotational drive power irrespective of the state of charge of the battery 11, and it is possible thereby to travel due to the rotational drive power thereof.

2. Second Embodiment

Figure 10:
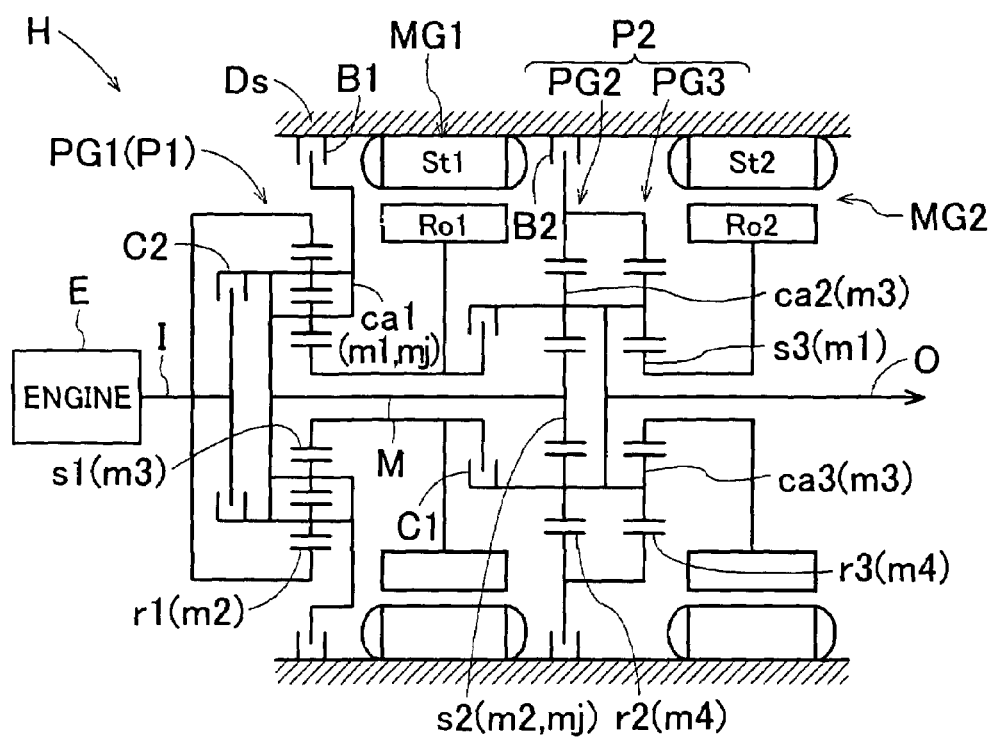
FIG. 10 is a skeleton diagram of a hybrid drive apparatus according to a second embodiment of the present invention.
Figure 11:
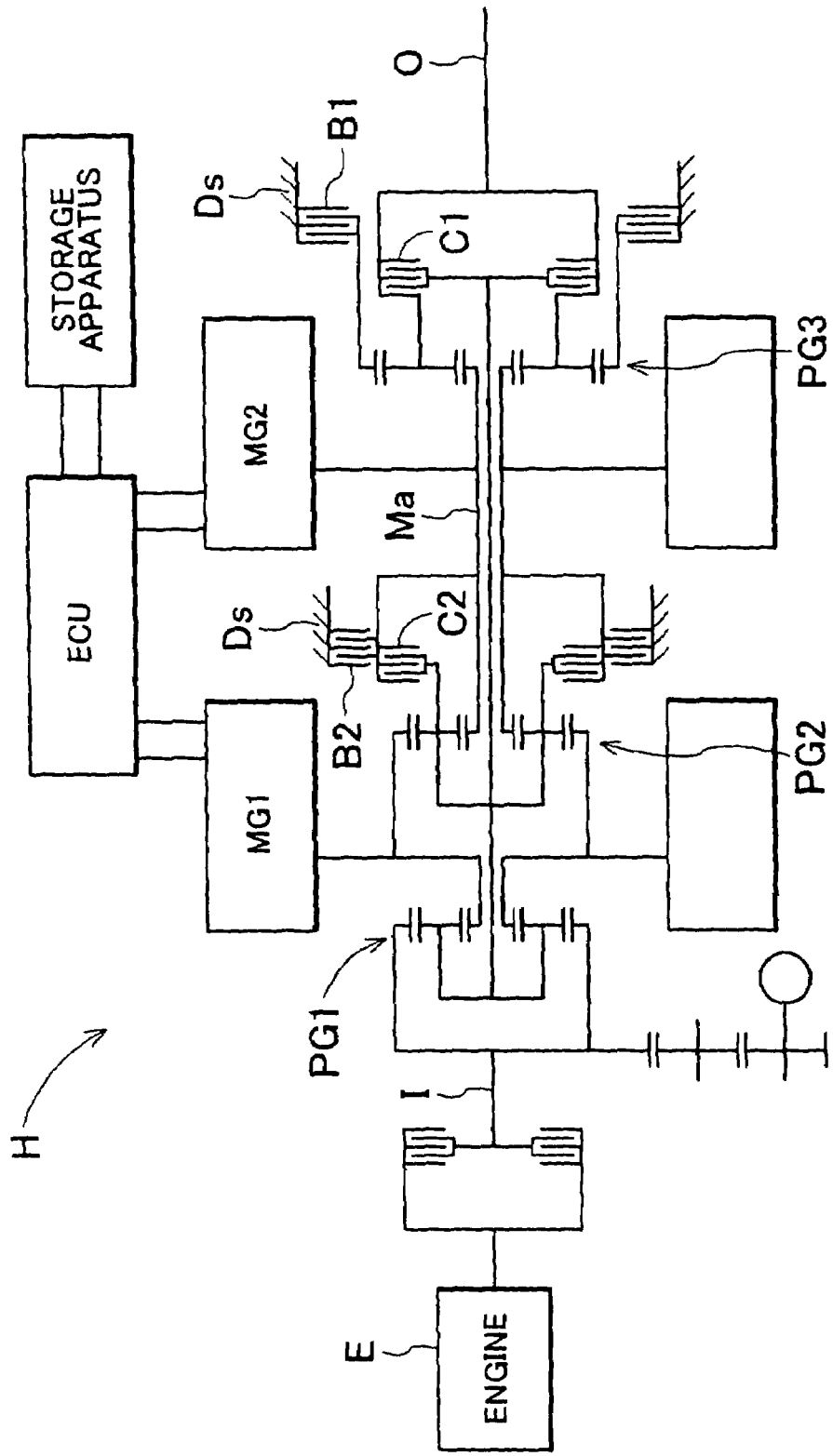
FIG. 11 is a skeleton diagram of a hybrid drive apparatus according to the related art.

Next, a second embodiment of the present invention will be explained. FIG. 10 is a skeleton diagram that shows the structure of the hybrid drive apparatus H according to this embodiment. In the hybrid drive apparatus H according to the present embodiment, only the specific structures for realizing each of the rotating elements of the first planetary gear apparatus P1 and the second planetary gear apparatus P2 differ from those of the first embodiment described above, and the other structures are basically identical. Specifically, the point that the first planetary gear apparatus P1 includes, in order of rotational speed, a first rotating element (m1), a second rotating element (m2), and a third rotating element (m3), and that the first rotating element (m1) acts as a connection rotating element (mj), and the point that the second planetary gear apparatus P2 includes, in order of rotational speed, a first rotating element (m1), a second rotating element (m2), a third rotating element (m3), and a fourth rotating element (m4), and that the second rotating element (m2) acts as a connection rotating element (mj), are identical to the first embodiment described above. In addition, the relationships between each of the rotating elements and each of the friction engagement elements C1, C2, B1, and B2 are identical to those in the first embodiment described above.

Therefore, the hybrid drive apparatus H according to this embodiment operates according to the operating table that is shown in FIG. 4. In addition, when the rotating elements (m1 to m4) in order of rotational speed in the first planetary gear apparatus P1 and the second planetary gear apparatus P2 are used as a reference, the velocity diagrams become identical to those in FIG. 6 to FIG. 9 of the first embodiment described above. Note that the other structures that are not specifically explained about are identical to those in the first embodiment described above. Below, the specific structures of the first planetary gear apparatus P1 and the second planetary gear apparatus P2 that differ from those of the first embodiment will be explained.

2-1. The Specific Structures of the First Planetary Gear Apparatus P1 and the Second Planetary Gear Apparatus P2

As shown in FIG. 10, the first planetary gear apparatus P1 is structured by the first planetary gear mechanism PG1, and the first planetary gear mechanism PG1 is similar to that of the first embodiment on the point that it is a double pinion planetary gear mechanism that is disposed coaxially to the input shaft I. In contrast, in the present embodiment, the carrier ca1 is connected to the sun gear s2 as the second rotating element (m2) of the second planetary gear mechanism PG2 via the transmitting member M so as to rotate integrally therewith. In addition, the ring gear r1 is connected to the input shaft I so as to rotate integrally therewith. Additionally, the sun gear s1 is connected to the rotor Ro1 of the first motor-generator MG1 so as to rotate integrally therewith. In the present embodiment, the carrier ca1, the ring gear r1, and the sun gear s1 of this first planetary gear mechanism PG1 respectively are examples of the "first rotating element (m1)," the "second rotating element (m2)," and the "third rotating element (m3)" of the first planetary gear apparatus P1. In addition, the carrier ca1 (first rotating element (m1)), which is connected to the transmitting member M so as to rotate integrally therewith, acts as a "connection rotating element (mj)."

In addition, the sun gear s1 of the first planetary gear mechanism PG1 is selectively connected to the output shaft o via the first clutch C1. As will be described below, the output shaft O is connected to the carrier ca2 of the second planetary gear mechanism PG2 and the carrier ca3 of the third planetary gear mechanism PG3 so as to rotate integrally therewith. Therefore, the first motor-generator MG1 and the sun gear s1 of the first planetary gear mechanism PG1 are selectively connected to the output shaft O, the carrier ca2 of the second planetary gear mechanism PG2, and the carrier ca3 of the third planetary gear mechanism PG3 via the first clutch C1. In addition, similar to the first embodiment described above, the ring gear r1 and the carrier ca1 of the first planetary gear mechanism PG1 are selectively connected via the second clutch C2. Therefore, when the second clutch C2 is engaged, the first planetary gear mechanism PG1 is directly connected so as to rotate integrally as a whole.

In addition, the point that the second planetary gear apparatus P2 is structured by the second planetary gear mechanism PG2 and the third planetary gear mechanism PG3, and the point that the second planetary gear mechanism PG2 and the third planetary gear mechanism PG3 are single pinion planetary gear mechanisms that are disposed coaxially to the output shaft O, are similar to the first embodiment described above. In contrast, in the present embodiment, in the second planetary gear mechanism PG2, the sun gear s2 is connected to the carrier cat of the first planetary gear mechanism PG1 via the transmitting member M so as to rotate integrally therewith. In addition, the carrier ca2 is connected to the output shaft O and the carrier ca3 of the third planetary gear mechanism PG3 so as to rotate integrally therewith. Additionally, the ring gear r2 is connected to the ring gear r3 of the third planetary gear mechanism PG3 so as to rotate integrally therewith. In addition, in the third planetary gear mechanism PG3, the sun gear s3 is connected to the rotor Ro2 of the second motor-generator MG2 so as to rotate integrally therewith. Additionally, the carrier ca3 is connected to the output shaft O and the carrier ca2 of the second planetary gear mechanism PG2 so as to rotate integrally therewith. In addition, the ring gear r3 is connected to the ring gear r2 of the second planetary gear mechanism PG2 so as to rotate integrally therewith. Additionally, the ring gear r2 of the second planetary gear mechanism PG2 and the ring gear r3 of the third planetary gear mechanism PG3, which rotate integrally, are selectively held stationary on the case Ds via the second brake B2.

As has been described above, in the second planetary gear mechanism PG2 and the third planetary gear mechanism PG3, among the three rotating elements that each has, two of each are connected so as to rotate integrally, and thereby, the second planetary gear apparatus P2 is structured so as to include four rotating elements. In addition, in the present embodiment, the sun gear s3 of the third planetary gear mechanism PG3 is an example of the "first rotating element (m1)" of the second planetary gear apparatus P2. The sun gear s2 of the second planetary gear mechanism PG2 is an example of the "second rotating element (m2)" of the second planetary gear apparatus P2. The carrier ca2 of the second planetary gear mechanism PG2 and the carrier ca3 of the third planetary gear mechanism PG3, which rotate integrally, are examples of the "third rotating element (m3)" of the second planetary gear apparatus P2. The ring gear r2 of the second planetary gear mechanism PG2 and the ring gear r3 of the third planetary gear mechanism PG3 are examples of the "fourth rotating element (m4)" of the second planetary gear apparatus P2. In addition, the sun gear s2 (the second rotating element (m2)) of the second planetary gear mechanism PG2, which is connected to the transmitting member M so as to rotate integrally therewith, is an example of the "connection rotating element (mj)."

In this hybrid drive apparatus H, similar to the first embodiment described above, the transmitting member M is selectively held stationary on the case Ds via the first brake B1. Therefore, the carrier ca1 (the first rotating element (m1) of the first planetary gear apparatus P1) of the first planetary gear mechanism PG1 and the sun gear s2 of the second planetary gear mechanism PG2 (the second rotating element (m2) of the second planetary gear apparatus P2)), which function as connection rotating elements (mj) that rotate integrally with this transmitting member M, similarly are also selectively held stationary on the case Ds via the first brake B1.

3. Other Embodiments (1) In the embodiments described above, an example was explained for the case in which the hybrid drive apparatus H is structured so as to be able to switch between three operating modes, that is, the series mode, the split mode, and the parallel mode. However, the structures of the hybrid drive apparatus H that are included in the applicable scope of the present invention are not limited thereby. Specifically, a hybrid drive apparatus H that is structured so as to enable realizing any one or more of these three operating modes is also one advantageous embodiment of the present invention.

(2) In each of the embodiments described above, an example was explained for the case in which the series mode functions as the reverse mode that is used when the vehicle is travelling in reverse. However, a series mode that functions as a forward travel operating mode or functions both as a forward travel and a reverse travel operating mode is also one advantageous embodiment.

(3) In each of the embodiments described above, an example was explained for the case in which the hybrid drive apparatus H includes a plurality of shift speeds for the split mode and the parallel mode. However, the applicable scope of the present invention is not limited thereby. Therefore, a stricture in which either one or both of the split mode and the parallel mode have only one shift speed is also one advantageous embodiment of the present invention.

(4) In addition, the structures of the first planetary gear apparatus P1 and the second planetary gear apparatus P2 and the configuration of the friction engagement elements for each of the rotating elements thereof that were explained in each of the embodiments described above are simply examples, and all structures that enable the realization of the structures of the present invention other than these structures are included in the applicable scope of the present invention.

The present invention can be used in what is termed a "split hybrid drive apparatus" that is provided with two rotary electric machines and vehicles in which such a drive apparatus is used.

According to an exemplary aspect of the invention, it is possible to hold connection rotating elements that are connected to as to rotate integrally via the transmitting member of the first planetary gear apparatus and the second planetary gear apparatus stationary on a non-rotating member by the first brake. In this state, the rotation of the input shaft is transferred to the first rotary electric machine via the first planetary gear apparatus, but is not transferred to the output shaft and the second rotary electric machine. Thus, it is possible to carry out travel by transferring the rotational drive power of the second rotary electric machine to the output shaft via the second planetary gear apparatus, while carrying out power generation by transferring the rotational drive power of the engine to the first rotary electric machine without being influenced thereby. Therefore, it is possible to carry out travel by using the rotational drive power of the second rotary electric machine over an extended period of time with a large rotational drive power irrespective of the state of charge of an storage means such as a battery. In contrast, while the first brake is disengaged, the rotational drive power of the input shaft (engine) is distributed to the first rotary electric machine and the transmitting member, and it is possible to travel by transferring the distributed rotational drive power to the output shaft.

Note that in the present application, the term "connection" includes structures in which the transfer of the rotation is carried out indirectly via one or more members, in addition to including a structure in which the transfer of the rotation is carried out directly. In addition, in the present application, in relation to the planetary gear mechanism that is provided with three rotating elements, that is, a sun gear, a carrier, and a ring gear, a single planetary gear mechanism or an apparatus that is obtained by stacking a plurality of planetary gear mechanisms is referred to as a "planetary gear apparatus."

According to another exemplary aspect of the invention, it is possible to carry out travel in the series mode in the case in which it is appropriate to travel by using only the rotational drive power of the second rotary electric machine, such as, for example, during reverse and the like. Travel can be carried out in the split mode in the state in which it is appropriate to travel with the assistance of the rotational drive power of the second rotary electric machine as necessary while the rotational drive power of the input shaft (engine) is distributed to the first rotary electric machine and the transmitting member, and the rotational drive power after distribution is transferred to the output shaft, such as, for example, during forward acceleration and the like. Therefore, it is possible to travel efficiently by selecting the appropriate travel mode depending on the vehicle travel state and the like.

According to another exemplary aspect of the invention, in the series mode that is established while the first brake is engaged, the rotation of the input shaft is transferred to the first rotary electric machine via the first planetary gear apparatus, but this rotation is not transferred to the output shaft or the second rotary electric machine. Therefore, according to such a structure, it is possible to carry out reverse travel appropriately by using the second rotary electric machine, without being influenced by the rotational drive power of the engine. In addition, at this time, because power generation is carried out by transferring the rotational drive power of the engine to the first rotary electric machine, it is possible to carry out reverse travel over an extended period of time by a large rotational drive power irrespective of the state of charge of a storage means such as a battery.

According to another exemplary aspect of the invention, it is possible to travel in the parallel mode while it is appropriate to travel assisted by the rotational drive power of the second rotary electric machine as necessary while changing the rotational drive power of the input shaft (engine) at the predetermined gear change ratio, and transferring the resulting rotational drive power to the output shaft, such as, for example, during normal travel. Therefore, it is possible to travel efficiently by selecting the appropriate travel mode depending on the travel conditions of the vehicle.

Note that in the present application, the term "order of rotational speed" is either the order from the high speed side to the low speed side or the order from the low speed side to the high speed side, and while either order is possible depending on the rotational state of each of the planetary gear apparatuses, in either case, the order of the rotating elements does not change.

According to another exemplary aspect of the invention, while the first brake is engaged, it is possible to transfer the reverse direction rotational drive power to the output shaft by rotating the second rotary electric machine in the forward direction.

According to another exemplary aspect of the invention, by engaging the second brake while the first brake is disengaged, it is possible to reduce the rotation speed of the input shaft (engine), which is transferred to the transmitting member, and the rotation speed of the second rotary electric machine, and transfer the resulting speeds to the output shaft.

According to another exemplary aspect of the invention, it is possible to use a structure that is provided with a plurality of shift speeds in travel modes referred to as a split mode and a parallel mode, which are realized while the first brake is disengaged.

What is claimed is:
1. A hybrid drive apparatus comprising:
an input shaft that is connected to an engine;
an output shaft that is connected to wheels;
a first rotary electric machine;
a second rotary electric machine;
a first planetary gear apparatus that has at least three rotating elements;
a second planetary gear apparatus that has at least three rotating elements; and
a plurality of friction engagement elements that selectively connect one rotating element of the first planetary gear apparatus and the second planetary gear apparatus to other rotating elements or that selectively hold the rotating element stationary on a non-rotating member, wherein:
the first planetary gear apparatus and the second planetary gear apparatus both comprise connection rotating elements that are connected via a transmitting member so as to rotate integrally;
two rotating elements of the first planetary gear apparatus, other than the connection rotating element, are connected respectively to the input shaft and the first rotary electric machine;
two rotating elements of the second planetary gear apparatus, other than the connection rotating element, are respectively connected to the output shaft and the second rotary electric machine;
the plurality of friction engagement elements comprise a first brake that selectively holds the transmitting member and the connection rotating elements that rotate integrally therewith stationary on the non-rotating member;
the hybrid drive apparatus is structured so as to enable switching to a parallel mode that has a plurality of shift speeds, and the hybrid drive apparatus changes a rotational speed of the input shaft by a predetermined gear change ratio according to each of the shift speeds, and transfers a resulting rotational speed to the output shaft; and
the hybrid drive apparatus is structured so as to be able to switch between:
a series mode in which the first brake is engaged, power generation is carried out by transferring a rotational drive power of the input shaft to the first rotary electric machine via the first planetary gear apparatus, and a rotational drive power of the second rotary electric machine is transferred to the output shaft via the second planetary gear apparatus; and
a split mode, in which the first brake is disengaged, the rotational drive power of the input shaft is distributed to both the first rotary electric machine and the transmitting member via the first planetary gear apparatus, and a rotational drive power that has been distributed to at least the transmitting member via the second planetary gear apparatus is transferred to the output shaft.

2. The hybrid drive apparatus according to claim 1, wherein control is carried out in which, in the series mode during reverse travel, the second rotary electric machine is rotated in a direction such that the output shaft rotates in reverse.

3. The hybrid drive apparatus according to claim 1, wherein:
the second planetary gear apparatus comprises, in order of rotational speed, at least a first rotating element, a second rotating element, and a third rotating element, and
the second rotary electric machine is connected to the first rotating element, the transmitting member is connected to the second rotating element that functions as the connection rotating element, and the output shaft is connected to the third rotating element.

4. The hybrid drive apparatus according to claim 3, wherein the second planetary gear apparatus comprises a fourth rotating element that follows the third rotating element in order of rotational speed, and the plurality of friction engagement elements includes a second brake that selectively holds the fourth rotating element stationary on the non-rotating member.

5. The hybrid drive apparatus according to claim 4, wherein:
the first planetary gear apparatus comprises, in order of rotational speed, at least a first rotating element, a second rotating element, and a third rotating element, and
the transmitting member is connected to the first rotating element that functions as the connection rotating element, the input shaft is connected to the second rotating element, and the first rotary electric machine is connected to the third rotating element.

6. The hybrid drive apparatus according to claim 5, wherein the plurality of friction engagement elements comprises a first clutch that selectively connects the third rotating element of the first planetary gear apparatus and the output shaft, and a second clutch that selectively connects two arbitrary rotating elements of the first planetary gear apparatus.

7. A hybrid drive apparatus comprising:
an input shaft that is connected to an engine;
an output shaft that is connected to wheels;
a first rotary electric machine;
a second rotary electric machine;
a first planetary gear apparatus that has at least three rotating elements;
a second planetary gear apparatus that has at least three rotating elements; and
a plurality of friction engagement elements that selectively connect one rotating element of the first planetary gear apparatus and the second planetary gear apparatus to other rotating elements or that selectively hold the rotating element stationary on a non-rotating member, wherein:
the first planetary gear apparatus and the second planetary gear apparatus both comprise connection rotating elements that are connected via a transmitting member so as to rotate integrally;
two rotating elements of the first planetary gear apparatus, other than the connection rotating element, are connected respectively to the input shaft and the first rotary electric machine;
two rotating elements of the second planetary gear apparatus, other than the connection rotating element, are respectively connected to the output shaft and the second rotary electric machine;
the plurality of friction engagement elements comprise a first brake that selectively holds the transmitting member and the connection rotating elements that rotate integrally therewith stationary on the non-rotating member;
the second planetary gear apparatus comprises, in order of rotational speed, at least a first rotating element, a second rotating element, and a third rotating element; and
the second rotary electric machine is connected to the first rotating element, the transmitting member is connected to the second rotating element that functions as the connection rotating element, and the output shaft is connected to the third rotating element.

8. The hybrid drive apparatus according to claim 7, wherein the second planetary gear apparatus comprises a fourth rotating element that follows the third rotating element in order of rotational speed, and the plurality of friction engagement elements includes a second brake that selectively holds the fourth rotating element stationary on the non-rotating member.

9. The hybrid drive apparatus according to claim 8, wherein:

the first planetary gear apparatus comprises, in order of rotational speed, at least a first rotating element, a second rotating element, and a third rotating element, and the transmitting member is connected to the first rotating element that functions as the connection rotating element, the input shaft is connected to the second rotating element, and the first rotary electric machine is connected to the third rotating element.

10. The hybrid drive apparatus according to claim 9, wherein the plurality of friction engagement elements comprises a first clutch that selectively connects the third rotating element of the first planetary gear apparatus and the output shaft, and a second clutch that selectively connects two arbitrary rotating elements of the first planetary gear apparatus.

11. A hybrid drive apparatus comprising:
an input shaft that is connected to an engine;
an output shaft that is connected to wheels;
a first rotary electric machine;
a second rotary electric machine;
a first planetary gear apparatus that has at least three rotating elements;
a second planetary gear apparatus that has at least three rotating elements; and
a plurality of friction engagement elements that selectively connect one rotating element of the first planetary gear apparatus and the second planetary gear apparatus to other rotating elements or that selectively hold the rotating element stationary on a non-rotating member, wherein:
the first planetary gear apparatus and the second planetary gear apparatus both comprise connection rotating elements that are connected via a transmitting member so as to rotate integrally;
two rotating elements of the first planetary gear apparatus, other than the connection rotating element, are connected respectively to the input shaft and the first rotary electric machine;
two rotating elements of the second planetary gear apparatus, other than the connection rotating element, are respectively connected to the output shaft and the second rotary electric machine;
the plurality of friction engagement elements comprise a first brake that selectively holds the transmitting member and the connection rotating elements that rotate integrally therewith stationary on the non-rotating member;
the first planetary gear apparatus comprises, in order of rotational speed, at least a first rotating element, a second rotating element, and a third rotating element; and
the transmitting member is connected to the first rotating element that functions as the connection rotating element, the input shaft is connected to the second rotating element, and the first rotary electric machine is connected to the third rotating element.

12. The hybrid drive apparatus according to claim 11, wherein the plurality of friction engagement elements comprises a first clutch that selectively connects the third rotating element of the first planetary gear apparatus and the output shaft, and a second clutch that selectively connects two arbitrary rotating elements of the first planetary gear apparatus.

* * * * *